Feb. 15, 1966    J. P. STADELMANN    3,234,757
ODOMETER DRIVE CABLE ASSEMBLY CONNECTOR
Filed Nov. 14, 1963
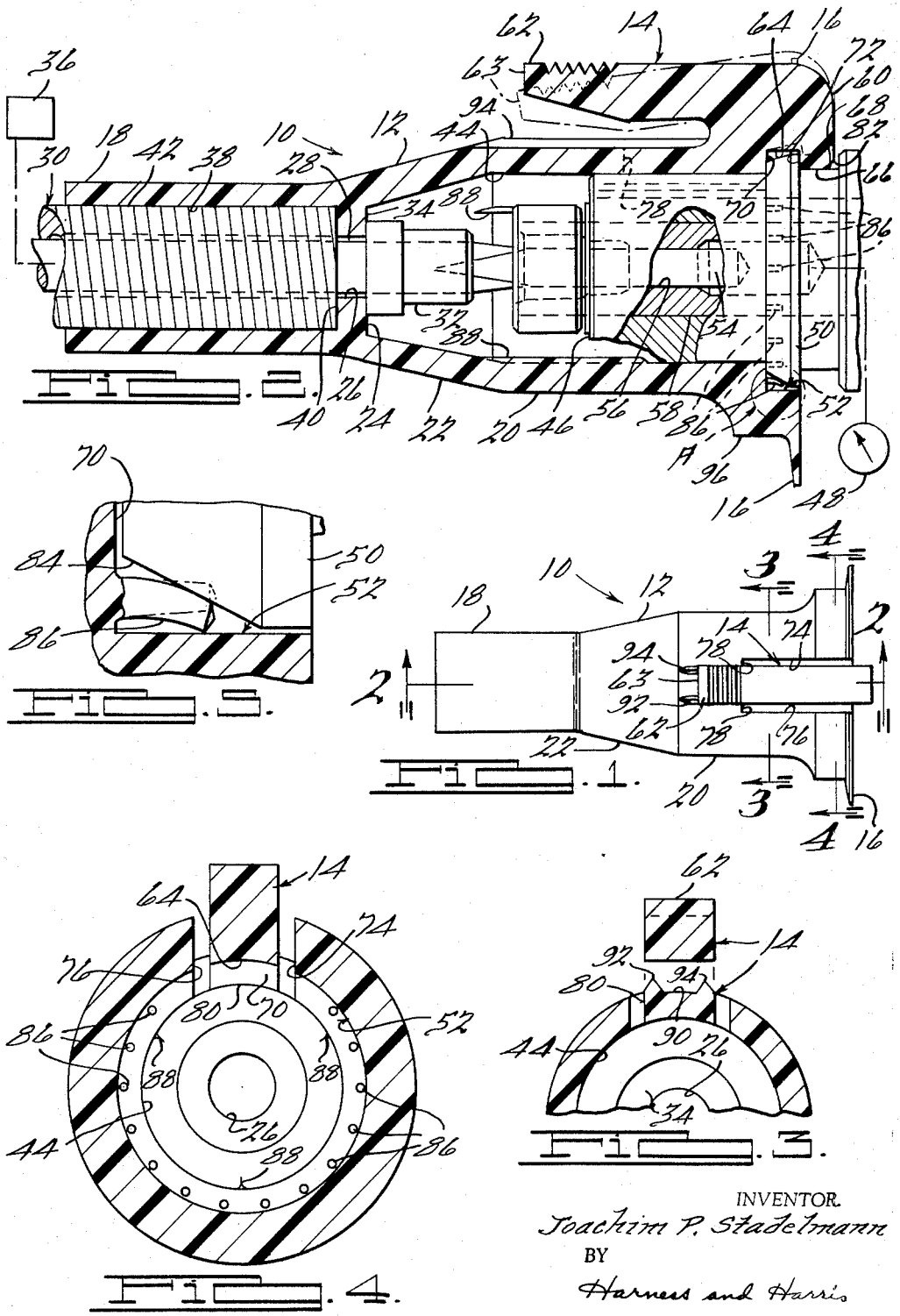
INVENTOR.
Joachim P. Stadelmann
BY
Harness and Harris
ATTORNEYS.

United States Patent Office 3,234,757
Patented Feb. 15, 1966

3,234,757
ODOMETER DRIVE CABLE ASSEMBLY CONNECTOR
Joachim P. Stadelmann, Madison Heights, Mich., assignor to Chrysler Corporation, Highland Park, Mich., a corporation of Delaware
Filed Nov. 14, 1963, Ser. No. 323,805
12 Claims. (Cl. 64—4)

This invention relates generally to a cable connector and more particularly to a connector used for connecting a drive cable to an odometer.

Heretofore, speedometers have had their associated drive cables connected thereto by a metal ferrule-like nut member which threadably engaged an externally threaded projection of a portion of the structure defining the speedometer frame.

The threaded connection has caused difficulty in effecting engagement or disengagement of the drive cable and ferrule with the speedometer frame, especially in automotive vehicles where relatively little space exists behind the vehicle dash panel.

The metal ferrule-like nut members of the prior art are also objectionable in other respects. For example, being of metal they are susceptible to permanent deformation as a result of merely being stepped on as when such a nut is disconnected during servicing of the speedometer or even during shipment as a component part. Further, such nuts are not only an excellent transmitter of sound vibrations but are also susceptible of becoming loosened by these same vibrations which occur during normal use of the vehicle.

In many instances speedometer cable assemblies are manufactured by one company and subsequently shipped to customers who incorporate such speedometer cable assemblies into automotive vehicles. The fastening nut of the prior art cable connectors is loosely retained about the end of the speedometer cable assembly thereby permitting the cable core drive tip to become exposed and damaged during shipment.

Further, the ferrule-like connectors of the prior art require the use of a washer, usually of fibrous material, situated about the cable core and between the drive tip of the cable core and a seat in the tubular extension of the cable shroud.

Accordingly, a general object of this invention is to provide a novel and improved drive cable connector which can be quickly and easily engaged with or disengaged from a cooperating odometer frame; more specifically an object of this invention is to provide a drive cable connector which can be engaged with and disengaged from a cooperating speedometer frame without reliance on any threaded connection therebetween.

Another object of this invention is to provide a drive cable assembly connector which is highly resistant to deforming forces applied thereagainst and which has the ability to yieldingly accommodate such forces without incurring permanent deformation.

Other more specific objects and advantages of this invention will become apparent when reference is made to the following description and accompanying drawings wherein:

FIGURE 1 is an elevational view of a speedometer ferrule constructed in accordance with the teachings of this invention;

FIGURE 2 is an enlarged cross-sectional view taken generally on the plane of line 2—2 of FIGURE 1, illustrating the ferrule operatively engaging an associated drive cable and speedometer frame;

FIGURE 3 is an enlarged fragmentary cross-sectional view taken substantially on the plane of line 3—3 of FIGURE 1 and looking in the direction of the arrows;

FIGURE 4 is an enlarged cross-sectional view taken substantially on the plane of line 4—4 of FIGURE 1; and FIGURE 5 is an enlarged view of the portion illustrated generally within circle A of FIGURE 2.

Referring in greater detail to the drawings, FIGURE 1 illustrates a ferrule 10 comprised of a generally tubular body 12 having integrally formed latch means 14 and an annular radiating flange 16 provided at one end thereof.

Body 12 is formed generally of two tubular housing portions 18 and 20 of which housing 18 is the smaller in cross-section. Housing portions 18 and 20 are preferably joined as by a tapered tubular transitional section 22.

As better seen in FIGURE 2, a radially inwardly directed annular wall 24, formed internally of body 12, defines an aperture 26 which serves as a bearing for core 28 of the speedometer drive cable assembly 30. A collar 32 suitably secured to core 28 for rotation therewith serves as an axial thrust bearing by abutting against surface 34 of wall 24 thereby preventing displacement of the core 28 axially to the left.

Housing portion 18 has formed therein a cylindrical opening 38 partly defined by surface 40 of wall 24. The core or cable 28 is provided with a flexible sheath or protective shroud 42 which has one end illustrated as being tightly received within opening 38.

Similarly, housing portions 20 and 22 are provided with a generally cylindrical opening 44 partly defined by surface 34 of wall 24. A cylindrical extension 46, comprising a portion of the frame of speedometer 48, is slidably received within opening 44 in a manner causing flange 50 of extension 46 to be received generally within a counterbore 52 of body 12.

One end of core or cable 28 is operatively connected to a suitable driving source 36, as possibly a vehicle transmission, which causes rotation of core 28 generally in accordance with vehicle travel, as is well known in the art. The other end of cable 28, provided with a suitable driving surface 54, is closely received and coupled within a driving recess 56 formed in a speedometer input shaft 58 journalled within the speedometer frame extension 46.

The latch means 14 is comprised of a hook portion 60 with an integrally formed generally axially directed lever 62. An arcuate-like notch 64 formed in hook portion 60 forms part of the counterbore 52. A radially inwardly directed lip 66 is received generally within a groove 68, of extension 46, so as to axially retain flange 50 between radially surface 70 of counterbore 52 and the radially directed inner surface 72 of lip 66. In the preferred embodiment of the invention, the latch means 14 is constructed in a manner so that the radial distance from the axis of the ferrule 10 to the radially innermost surface of lip 66 is in the free state of the latch means, less than the radius of the annular groove 68. Consequently, whenever lip 66 is received within groove 68, it not only retains flange 50 but also abuts against the innermost portion of the groove 68 so as to apply a generally radially inwardly directed force thereagainst. This enhances the noise dampening characteristics of the ferrule.

Axially directed slots 74 and 76 are formed through housing portion 20 on opposite sides of lever 62 and hook 60. Each of the slotas extends from flange 16 axially inwardly of body 12 and terminates as at 78 thereby providing a relatively elongated spring-like portion 80 connected at one end to housing portion 20. By forcing end 63 of lever 62 toward the axis of body 12 (illustrated in phantom line in FIGURE 2), the elongated portion 80 is flexed radially outwardly moving hook 60 and lip 66 to a position whereat ferrule 10 can be moved axially to the left of extension 46 and flange 50 in order to bring about disengagement therebetween. However, in order to effect engagement, end 63 of lever 62 need not be depressed since the inclined cam surface 82 of hook 60 will engage the inclined surface 84 of flange 50 and automatically be urged radially outwardly as the extension 46 and ferrule 10 are moved axially toward each other.

Counterbore 52 is also provided with a plurality of circumferentially spaced locating fingers 86 projecting axially of ferrule 10 from radial surface 70 of counterbore 52. As seen in FIGURE 4, the preferred embodiment of the invention does not have any such fingers 86 formed on the portion of surface 70 carried by portion 80 of the latch means 14.

The entire ferrule is formed of a plastic which is tough, resilient and has a high tensile strength, high flexural modulus, high fatigue endurance and a slippery low friction surface. It has been discovered that acetal resin, a high melting, highly crystalline, thermoplastic polymer having a chemical structure represented by the formula $(-OCH_2-)_n$ is highly suited for forming the ferrule 10. In this connection it has also been discovered that an acetal resin derived by polymerization of formaldehyde and sold commercially under the trademark, Delrin, is particularly suitable for use in forming a ferrule according to the invention. Delrin acetal resin as tested by the ASTM (American Society of Testing Materials) under standard conditions possesses the following physical properties:

| Property | ASTM No. | Value |
| --- | --- | --- |
| Tensile strength at 75° F | D-638 | 10,000 p.s.i. |
| Flexural modulus at 73° F | D-790 | 410,000 p.s.i. |
| Specific gravity | D-792 | 1.425. |
| Melting point (crystalline) | | 347° F. |
| Coefficient of linear thermal expansion | D-696 | $4.5 \times 10^{-5}$. |
| Thermal conductivity | | 1.6 B.t.u./hr./ sq. ft./° F./in. |

Fingers 86, being of plastic are relatively resilient and are intended to undergo deflection, as illustrated in FIGURE 5, whenever flange 50 is moved into the position shown. Certain highly desirable characteristics are achieved as a consequence of the provision of such resilient fingers or locators 86.

For example, the deflection of fingers 86 accommodates variations which may occur during manufacturing in the axial thickness of flange 50 and the axial depth of counterbore 52 without subsequently allowing any perceptible shifting of the ferrule 10 along its longitudinal axis once the ferrule is engaged with flange 50 of extension 46. Fingers 86 also serve to center the open or counterbore end of the ferrule 10 on the flange 50 and to effectively prevent any relative radial movement between the engaged ferrule and flange 50. Further, the friction resulting from the force required to deflect fingers 86 prevents rotation of ferrule 10 about flange 52 of extension 46.

As illustrated in FIGURES 2 and 4 a plurality of spaced axially extending thin flexible rib-like members 88 are formed on the wall surface of opening 44 in a manner so as to be directed generally radially inwardly thereof. The entire ferrule is of molded construction and the flexible rib members 88 are formed integrally in opening 44 at the time of molding. The thickness of ribs 88 need not be great and, in fact, it has been discovered a thickness approximating that of flashing often incurred in molding operations is sufficient.

The function of ribs 88 is somewhat similar to that of the fingers 86. That is ribs 88 are intended to be flexed and resiliently deformed by the extension 46 upon introduction thereof into the opening 44. The spaced ribs 88 being thusly deformed function to center opening 44 about the innermost end of frame extension 46 and to effectively prevent any relative radial movement therebetween. Accordingly, it should be apparent that the combined action of fingers 86 and ribs 88 causes the most accurate axial alignment between the ferrule 10 and extension 46 with due consideration being given to the dimensional variations occurring during manufacturing.

The longitudinally medial portion 90 of the spring-like member 80 is preferably formed to have a reduced radial cross-sectional thickness as compared to other portions of the housing portion 20. Further, longitudinally extending ribs 92 and 94 are formed along opposite sides of member 80 so as to be directed generally outwardly of housing 20. It has been discovered that in certain applications of the invention a sudden generally radially inwardly directed impact, of sufficient magnitude, against body 12 apparently created a vibration therein of a frequency sufficient to cause a failure at the area of juncture between member 80 and body 12. The provision of a non-uniform cross-section as determined by the generally discontinuous outer surface of member 80 apparently both strengthens member 80 and dampens vibrations occurring therein thereby preventing a failure thereof.

Flange 16 is provided on body 12 primarily for protection against accidental damage. That is, should any generally radially inwardly directed force be applied against the open connecting end of body 12, flange 16 will tend to absorb and dissipate such force before any substantial effect thereof can be experienced by the enlarged annular portion 96 which is provided for enhancing the rigidity of that same end. In furtherance of this purpose, as illustrated in FIGURE 1, flange 16 is made of tapered cross-section so as to have the outer peripheral portion thereof of minimum thickness thereby permitting the flange to experience proportionately decreasing degrees of deflection from the periphery radially inwardly without causing substantial localization of stresses at the juncture of flange 16 and annular portion 96.

Shroud or cable housing 42 which, for purposes of flexibility, may be comprised of closely helically wound metal coils, is introduced into chamber 38 as illustrated in FIGURE 1 and housing portion 18 is forced generally radially inwardly as by oppositely disposed die-like members engaging the outer surface of portion 18 in a swaging-like manner. If desired, heat may at this time be supplied directly to housing portion 18 or indirectly as by heating the swaging or die-like members.

Since the material from which ferrule 10 is formed has a slippery surface, there is no need for a fibrous washer as in the prior art. Accordingly, thrust member 32 is permitted to directly engage surface 34 of wall 24.

It should be apparent that in addition to all of the other benefits, a ferrule constructed in accordance with this invention provides an excellent barrier to the transmission of noise vibrations from the vehicular drive train to the dash panel of the passenger compartment. This is believed due not only to the physical characteristics of the plastic selected but also attributable to the resilient deflection of pins or fingers 86 and flexible ribs 88.

Although but one preferred form of the invention has been disclosed and described it should be apparent that other embodiments and modifications of the invention are possible within the scope of the appended claims.

I claim:

1. An odometer drive cable assembly connector, comprising a body of Delrin plastic, said body comprising a first tubular housing portion, a second tubular housing portion in substantial axial alignment with said first tubular housing portion and a tapered tubular transitional section interconnecting said first and second tubular housing portions so as to form a first outer open end in said first housing portion and a second open end in said second housing portion; an integral transverse wall formed internally of said body substantially at the juncture of said first tubular housing portion and said tapered tubular transitional section; an aperture formed through said wall is general axial alignment with said first and second tubular housing portions; an annular reinforcing portion formed integrally with said second housing portion generally externally thereof and near said second open end; an annular flange forced integrally with said body and radiating outwardly from said annular reinforcing member, said flange decreasing in thickness generally proportionately with increasing distance from the axis of said body so to enhance the flexural characteristics thereof; a counterbore formed in said second open end in general axial alignment with said second tubular housing portion, said counterbore terminating at its innermost end in an annular radially extending abutment surface; a plurality of circumferentially spaced relatively flexible fingers formed integrally with said abutment surface and extending generally axially therefrom; latching means formed integrally with said body, said latching means comprising a generally axially positioned lever joined near one end to said second tubular housing portion, said lever including a lip portion directed generally radially inwardly and terminating at a distance from the axis of said second housing portion less than the distance from said axis to the axially directed surface defining said counterbore; a first axially directed slot formed through said flange, annular reinforcing portion and second tubular portion on one side of said lever; a second axially directed slot formed through said flange, annular reinforcing portion and second tubular housing portion on the other side of said lever opposite to said one side; said first and second slots cooperating to define a generally resilient member having a juncture at one end with said second tubular housing portion and a juncture near its opposite end with said lever; a pair of spaced axially extending first ribs formed along said resilient member externally thereof; the medial portion of said resilient member between said first ribs being of reduced cross-sectional thickness as compared to the thickness of the remainder of said second tubular housing portion; and a plurality of relatively flexible axially extending second ribs formed within and integrally with said second tubular housing portion and directed radially inwardly thereof; said first housing portion being adapted to partly receive therein a protective shroud of a drive cable assembly; said aperture being adapted to receive therethrough a driving core of said drive cable assembly; and counterbore being adapted to receive therein a connecting portion of an associated odometer assembly; and said lip portion being adapted to engage said connecting portion and prevent undesirable axial movement thereof relative to said body.

2. A connecting ferrule, comprising a plastic body of acetal resin, said body comprising a first tubular housing portion, a second tubular housing portion in substantial axial alignment with said first tubular housing portion and a tapered tubular transitional section interconnecting said first and second tubular housing portions so as to form a first outer open end in said first housing portion and a second open end in said second housing portion; an integral transverse wall formed internally of said body substantially at the juncture of said first tubular housing portion and said tapered tubular transitional section; an aperture formed through said wall in general axial alignment with said first and second tubular housing portions; an annular reinforcing portion formed integrally with said second housing portion generally externally thereof and near said second open end; an annular flange formed integrally with said body and radiating outwardly from said annular reinforcing member, said flange decreasing in thickness generally proportionately with increasing distance from the axis of said body so as to enhance the flexural characteristic thereof; a counterbore formed in said second open end in general axial alignment with said second tubular housing portion, said counterbore terminating at its innermost end in an annular radially extending abutment surface; a plurality of circumferentially spaced relatively flexible fingers formed integrally with said abutment surface and extending generally axially therefrom; latching means formed integrally with said body, said latching means comprising a generally axially positioned lever joined near one end to said second tubular housing portion, said lever including a lip portion directed generally radially inwardly and terminating at a distance from the axis of said second housing portion less than the distance from said axis to the axially directed surface defining said counterbore; a first axially directed slot formed through said flange, annular reinforcing portion and second tubular housing portion on one side of said lever; a second axially directed slot formed through said flange, annular reinforcing portion and second tubular housing portion on the other side of said lever opposite to said one side; said first and second slots cooperating to define a generally resilient member having a juncture at one end with said second tubular housing portion and a juncture near its opposite end with said lever; and a plurality of relatively flexible axially extending ribs formed within and integrally with said second tubular housing portion and directed radially inwardly thereof; said first housing portion being adapted to partly receive therein a protective shroud of a drive cable assembly; said aperture being adapted to receive therethrough a driving core of said drive cable assembly; said counterbore being adapted to receive therein a connecting portion of an associated odometer assembly; and said lip portion being adapted to engage said connecting portion and prevent undesirable axial movement thereof relative to said body.

3. A plastic connecting ferrule, comprising a molded plastic body, said body comprising a first housing portion, a second housing portion in substantial axial alignment with said first housing portion and a transitional section interconnecting said first and second housing portions so as to form a first outer open end in said first housing portion and a second open end in said second housing portion; an integral transverse wall formed internally of said body substantially at the juncture of said first housing portion and said transitional section; and aperture formed through said wall in general axial alignment with said first and second housing portions; an annular flange formed integrally with said body and radiating outwardly therefrom, said flange decreasing in thickness generally proportionately with increasing distance from the axis of said body so as to enhance the flexural characteristics thereof; a counterbore formed in said second open end in general axial alignment with said second housing portion, said counterbore terminating at its innermost end in an annular radially extending abutment surface; a plurality of circumferentially spaced relatively flexible fingers formed integrally with said abutment surface and extending generally axially therefrom; latching means formed integrally with said body, said latching means comprising a generally axially positioned lever joined near one end to said second housing portion, said lever including a lip portion directed generally radially inwardly and terminating at a distance from the axis of said second housing portion less than the distance from said axis to the axially directed surface defining said counterbore; a generally resilient member formed integrally with said body and having a juncture at one end with said second housing portion and a juncture near its opposite end with said lever; and a plurality of relatively flexible axially extending ribs formed within and integrally with said second housing portion and directed radially inwardly thereof.

4. A plastic connecting ferrule, comprising a plastic body, said body comprising a first tubular housing portion, a second tubular housing portion in substantial axial alignment with said first tubular housing portion and a tapered tubular transitional section interconnecting said first and second tubular housing portions so as to form a first outer open end in said first housing portion and a second open end in said second housing portion; an integral transverse wall formed internally of said body substantially at the juncture of said first tubular housing portion and said tapered tubular transitional section; an aperture formed through said wall in general axial alignment with said first and second tubular housing portions; an annular flange formed integrally with said body and radiating outwardly therefrom, said flange decreasing in thickness generally proportionately with increasing distance from the axis of said body so as to enhance the flexural characteristics thereof; a counterbore formed in said second open end in general axial alignment with said second tubular housing portion, said counterbore terminating at its innermost end in annular radially extending abutment surface; a plurality of circumferentially spaced relatively flexible fingers formed integrally with said abutment surface and extending generally axially therefrom; latching means formed integrally with said body, said latching means comprising a generally axially positioned lever joined near one end to said second tubular housing portion, said lever including a lip portion directed generally radially inwardly and terminating at a distance from the axis of said second housing portion less than the distance from said axis to the axially directed surface defining said counterbore; a first axially directed slot formed through said flange and second tubular housing portion on one side of said lever; a second axially directed slot formed through said flange and second tubular housing portion on the other side of said lever opposite to said one side; said first and second slots cooperating to define a generally resilient member having a juncture at one end with said second tubular housing portion and a juncture near its opposite end with said lever; a pair of spaced axially extending first ribs formed along said resilient member externally thereof, the medial portion of said resilient member between said first ribs being of reduced cross-sectional thickness as compared to the thickness of the remainder of said second tubular housing portion; and a plurality of relatively flexible axially extending second ribs formed within and integrally with said second tubular housing portion and directed radially inwardly thereof; said first housing portion being adapted to partly receive therein a protective shroud of a drive cable assembly; said aperture being adapted to receive therethrough a driving core of said drive cable assembly; said counterbore being adapted to receive therein a connecting portion of an associated odometer assembly; and said lip portion being adapted to engage said connecting portion and prevent undesirable axial movement thereof relative to said body.

5. A plastic connecting ferrule, comprising a body, said body comprising a first tubular housing portion, a second tubular housing portion in substantial axial alignment with said first tubular housing portion and a tapered tubular transitional section interconnecting said first and second tubular housing portions so as to form a first outer open end in said first housing portion and a second open end in said second housing portion; an integral transverse wall formed internally of said body substantially at the juncture of said first tubular housing portion and said tapered tubular transitional section; an aperture formed through said wall in general axial alignment with said first and second tubular housing portions; an annular flange formed integrally with said body and radiating outwardly therefrom, said flange decreasing in thickness generally proportionately with increasing distance from the axis of said body so as to enhance the flexural characteristics thereof; a counterbore formed in said second open end in general axial alignment with said second tubular housing portion, said counterbore terminating at its innermost end in an annular radially extending abutment surface; a plurality of circumferentially spaced relatively flexible fingers formed integrally with said abutment surface and extending generally axially therefrom; latching mens formed integrally with said body, said latching means comprising a generally axially positioned lever joined near one end to said second tubular housing portion, said lever including a lip portion directed generally radially inwardly and terminating at a distance from the axis of said second housing portion less than the distance from said axis to the axially directed surface defining said counterbore; a first axially directed slot formed through said flange and second tubular housing portion on one side of said lever; a second axially directed slot formed through said flange and second tubular housing portion on the other side of said lever opposite to said one side; said first and second slots cooperating to define a generally resilient member having a juncture at one end with said second tubular housing portion and a juncture near its opposite end with said lever; a pair of spaced axially extending first ribs formed along said resilient member externally thereof, the medial portion of said resilient member between said first ribs being of reduced cross-sectional thickness as compared to the thickness of the remainder of said second tubular housing portion; and a plurality of relatively flexible axially extending second ribs formed within and integrally with said second tubular housing portion and directed radially inwardly thereof.

6. A plastic connecting ferrule, comprising a body, said body comprising a first housing portion, a second housing portion in substantial axial alignment with said first housing portion and an intermediate section interconnecting said first and second housing portions so as to form a first outer open end in said first housing portion and a second open end in said second housing portion; a transverse wall provided internally of said body substantially at the juncture of said first housing portion and said section; an aperture formed through said wall in general axial alignment with said first and second tubular housing portions; an annular reinforcing portion formed integrally with said second housing portion generally externally thereof and near said second open end; an annular flange formed integrally with said body and radiating outwardly from said annular reinforcing member, said flange decreasing in thickness generally proportionately with increasing distance from the axis of said body so as to enhance the flexural characteristics thereof; a counterbore formed in said second open end in general axial alignment with said second tubular housing portion, said counterbore terminating at its innermost end in an annular radially extending abutment surface; a plurality of circumferentially spaced relatively flexible fingers formed integrally with said abutment surface and extending generally axially therefrom; latching means formed integrally with said body, said latching means comprising a generally axially positioned lever joined near one end to said second tubular housing portion, said lever including a generally radially inwardly directed lip portion directed generally radially inwardly and terminating at a distance from the axis of said second housing portion less than the distance from said axis to the axially directed surface defining said counterbore; a first axially directed slot formed through said flange, annular reinforcing portion and second tubular housing portion on one side of said lever; a second axially directed slot formed through said flange, annular reinforcing portion and second tubular housing portion on the other side of said lever opposite to said one side; said first and second slots cooperating to define a generally resilient member having a juncture at one end with said second tubular housing portion and a juncture near its opposite end with said lever; a pair of spaced axially extending ribs formed along said resilient member externally thereof; the medial portion of said resilient member between said first ribs being of reduced cross-sectional thickness as compared to the thickness of the remainder of said second tubular housing portion; and a plurality of relatively flexible axially extending second ribs formed within and integrally with said second tubular housing portion and directed radially inwardly thereof; said first housing portion being adapted to partly receive therein a protective shroud of a drive cable assembly; said aperture being adapted to receive therethrough a driving core of said drive cable assembly; said counterbore being adapted to receive therein a connecting portion of an associated odometer assembly; and said lip portion being adapted to engage said connecting portion and prevent undesirable axial movement thereof relative to said body.

7. A plastic connecting ferrule, comprising a body, said body comprising a first housing portion, a second housing portion connected to said first housing portion in substantial axial alignment therewith; a first outer open end in said first housing portion and a second open end in said second housing portion; a transverse wall provided internally of said body; an aperture formed through said wall in general axial alignment with said first and second housing portions; an annular flange formed integrally with said body and radiating outwardly therefrom; a counterbore formed in said second open end in general axial alignment with said second housing portion, said counterbore terminating at its innermost end in an annular radially extending abutment surface; a plurality of circumferentially spaced relatively flexible fingers formed integrally with said abutment surface and extending generally axially therefrom; latching means formed integrally with said body, said latching means comprising a generally axially positioned lever joined near one end to said second housing portion, said lever including a lip portion directed generally radially inwardly; a first axially directed slot formed through said flange and second housing portion on one side of said lever; a second axially directed slot formed through said flange and second housing portion on the other side of said lever opposite to said one side; said first and second slots cooperating to define a generally resilient member having a juncture at one end with said second housing portion and a juncture near its opposite end with said lever; and a plurality of relatively flexible axially extending ribs formed within and integrally with said second tubular portion and directed radially inwardly thereof.

8. A plastic connecting ferrule, comprising a body, said body comprising a first housing portion, a second housing portion connected to said first housing portion in substantial axial alignment therewith; a first outer open end in said first housing portion and a second open end in said second housing portion; a transverse wall provided internally of said body; an aperture formed through said wall in general axial alignment with said first and second housing portions; an annular flange formed integrally with said body and radiating outwardly therefrom, a counterbore formed in said second open end in general axial alignment with said second housing portion, said counterbore terminating at its innermost end in an annular radially extending abutment surface; a plurality of circumferentially spaced relatively flexible fingers formed integrally with said abutment surface and extending generally axially therefrom; latching means formed integrally with said body, said latching means comprising a generally axially positioned lever joined near one end to said second housing portion, said lever including a lip portion directly generally radially inwardly; a first axially directed slot formed through said flange and second tubular housing portion on one side of said lever; a second axially directed slot formed through said flange and second housing portion on the other side of said lever opposite to said one side; said first and second slots cooperating to define a generally resilient member having a juncture at one end with said second housing portion and a juncture near its opposite end with said lever; a pair of spaced axially extending ribs formed along said resilient member externally thereof; and a plurality of relatively flexible axially extending second ribs formed within and integrally with said second tubular housing portion and directed radially inwardly thereof.

9. A vehicular speedometer drive arrangement, comprising a speedometer, a speedometer frame, a generally cylindrical speedometer frame extension, a rotatably driven motion transmitting member journalled within said frame extension, a driving surface formed within said motion transmitting member, a first annular flange formed about said extension and axially spaced from the end thereof, a plastic connecting ferrule having a first open end for slidably receiving said cylindrical extension, a counterbore formed in said first open end for receiving said first annular flange, latching means comprising a lever operated hook for engaging said first annular flange in order to prevent withdrawal of said first flange from said counterbore, a plurality of resilient finger members projecting axially from said counterbore for resiliently engaging and urging said first flange axially against said hook in the direction of withdrawal of said first flange from said counterbore, a plurality of circumferentially spaced resilient members carried by said ferrule for resiliently engaging said cylindrical extension, a second generally annular flange formed on said ferrule about said first open end, a second open end formed in said ferrule, a generally flexible drive cable assembly including a rotatable driving core carried within an outer flexible cable housing, one end of said cable housing being tightly received within said second open end, a wall portion provided within said ferrule generally separating said first and second open ends, an aperture formed through said wall portion, one end of said driving core received through said aperture and extending into said driving surface, and a collar member secured to said driving core for rotation therewith for preventing the withdrawal of said core through said aperture.

10. A vehicular speedometer drive arrangement, comprising a speedometer, a speedometer frame, a generally cylindrical speedometer frame extension, a rotatably driven motion transmitting member journalled within said frame extension, a driving surface formed within said motion transmitting member, an annular flange formed about said extension and axially spaced from the end thereof, a plastic connecting ferrule having a first open end for slidably receiving said cylindrical extension, a counterbore formed in said first open end for receiving said annular flange, latching means comprising a lever operated hook for engaging said annular flange in order to prevent withdrawal of said flange from said counterbore, first resilient means formed in said ferrule for resiliently engaging and urging said flange axially against said hook in the direction of withdrawal of said flange from said counterbore, a plurality of circumferentially spaced resilient members carried by said ferrule for resiliently engaging said cylindrical extension, a second open end formed in said ferrule, a generally flexible drive cable assembly including a rotatable driving core carried within an outer flexible cable housing, one end of said cable housing being tightly received within said second open end, wall portion provided within said ferrule generally separating said first and second open ends, an aperture formed through said wall portion, one end of said driving core received through said aperture and extending into said driving surface, and a collar member secured to said driving core for rotation therewith for preventing the withdrawal of said core through said aperture.

11. A vehicle speedometer drive arrangement, comprising a speedometer, a speedometer frame, a generally cylindrical speedometer frame extension, a rotatably driven motion transmitting member journalled within said frame extension, a driving surface formed within said motion transmitting member, an annular flange formed about said extension and axially spaced from the end thereof, a plastic connecting ferrule having a first open end for slidably receiving said cylindrical extension, a counterbore formed in said first open end for receiving said anular flange, latching means comprising a lever operated hook for engaging said annular flange in order to prevent withdrawal of said flange from said counterbore, first resilient means formed in said counterbore for resiliently engaging and urging said flange axially against said hook in the direction of withdrawal of said flange from said counterbore, a plurality of circumferentially spaced resilient members carried by said ferrule for resiliently engaging said cylindrical extension, a second open end formed in said ferrule, a generally flexible drive cable assembly including a rotatable driving core carried within an outer flexible cable housing, one end of said cable housing being tightly received within said second open end, a wall portion provided within said ferrule generally separating said first and second open ends, an aperture formed through said wall portion, one end of said driving core received through said aperture and extending into said driving surface, and a collar member secured to said driving core for rotation therewith for axially abuutably engaging said wall portion in order to prevent the withdrawal of said core through said aperture.

12. A plastic connecting ferrule, comprising a body, said body comprising a first housing portion, a second housing portion connected to said first housing portion in substantial axial alignment therewith; a first outer open end in said first housing portion and a second open end in said second housing portion; a generally transverse wall provided internally of said body; an aperture formed through said wall in general axial alignment with said first and second housing portions; a counterbore formed in said second open end in general axial alignment with said second housing portion; resilient means carried by said ferrule for at times engaging an associated member adapted to be secured to said body; latching means formed integrally with said body said latching means comprising a generally axially positioned lever joined near one end to said second housing portion, said lever including a lip portion for engaging and securing said associated member; a first axially directed slot formed through said second housing portion on one side of said lever; and a second axially directed slot formed through said second housing portion on the other side of said lever opposite to said one side said first and second slots cooperating to define a generally resilient member having a juncture at one end with said second housing portion and a juncture near its opposite end with said lever.

References Cited by the Examiner
UNITED STATES PATENTS

| | | | |
|---|---|---|---|
| 1,355,659 | 10/1920 | Evslin | 64—4 |
| 2,872,793 | 2/1959 | Botti | 64—4 |
| 2,884,771 | 5/1959 | Holt | 64—4 |
| 2,893,221 | 7/1959 | Bell | 64—4 |
| 3,139,768 | 7/1964 | Biesecker | 74—501 |

BROUGHTON G. DURHAM, *Primary Examiner.*